US008055371B2

(12) United States Patent
Sanford et al.

(10) Patent No.: US 8,055,371 B2
(45) Date of Patent: Nov. 8, 2011

(54) SERVICES PORTAL

(75) Inventors: Fred Sanford, Attleboro, MA (US);
Robert Bather, Taunton, MA (US);
Martin Culverhouse, St Thomas, VI (US); Walter Sikora, Attleboro, MA (US); Melanie Russell, Foxboro, MA (US); Peter Martin, Carver, MA (US); Robert Hasselbaum, North Attleboro, MA (US); Russell Barr, Millis, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 12/938,552

(22) Filed: Nov. 3, 2010
(Under 37 CFR 1.47)

(65) Prior Publication Data
US 2011/0055118 A1 Mar. 3, 2011

Related U.S. Application Data

(60) Division of application No. 12/016,576, filed on Jan. 18, 2008, now Pat. No. 7,840,296, which is a continuation of application No. 10/680,411, filed on Oct. 8, 2003, now Pat. No. 7,328,078.

(60) Provisional application No. 60/416,538, filed on Oct. 8, 2002.

(51) Int. Cl.
*G06F 19/00* (2006.01)
*G05B 13/02* (2006.01)
(52) U.S. Cl. .................................. 700/108; 700/36
(58) Field of Classification Search .............. 700/36, 700/108; 705/7, 8
See application file for complete search history.

(56) References Cited

U.S. PATENT DOCUMENTS

| | | | |
|---|---|---|---|
| 3,576,976 A * | 5/1971 | Russo et al. | 700/32 |
| 5,134,574 A | 7/1992 | Beaverstock | |
| 5,521,814 A * | 5/1996 | Teran et al. | 700/266 |
| 5,684,945 A | 11/1997 | Chen | |
| 6,038,540 A * | 3/2000 | Krist et al. | 705/7.33 |
| 6,151,601 A | 11/2000 | Papierniak | |
| 6,285,966 B1 | 9/2001 | Brown | |
| 6,317,701 B1 | 11/2001 | Pyötsiä | |
| 6,356,205 B1 | 3/2002 | Salvo | |
| 6,449,715 B1 | 9/2002 | Krivoshein | |
| 6,529,780 B1 | 3/2003 | Soergel | |
| 6,618,745 B2 | 9/2003 | Christensen | |
| 6,631,305 B2 * | 10/2003 | Newmark | 700/110 |
| 6,633,782 B1 | 10/2003 | Schleiss et al. | |
| 6,725,182 B2 | 4/2004 | Pagnano | |
| 6,795,798 B2 | 9/2004 | Eryurek | |
| 6,816,747 B2 * | 11/2004 | Mammoser et al. | 700/109 |
| 2002/0133254 A1 | 9/2002 | Elwood | |
| 2003/0144932 A1 | 7/2003 | Martin | |
| 2005/0007249 A1 | 1/2005 | Eryurek | |

OTHER PUBLICATIONS

International Search Report mailed Nov. 24, 2004 for International Application No. PCT/US03/31854.

* cited by examiner

*Primary Examiner* — Ryan Jarrett
(74) *Attorney, Agent, or Firm* — Fish & Richardson, P.C.

(57) ABSTRACT

An apparatus for monitoring performance of an industrial process includes a service portal for collecting, transmitting and analyzing parameter data from process field devices that includes a network connection that connects to a process control system of the industrial process, a remote collector that collects parameter data from process field devices, a processor that identifies, sorts, and stores the collected parameter data and a communications module for transmitting the stored parameter data to a remote monitoring station for analysis.

13 Claims, 4 Drawing Sheets

SERVICES PORTAL

CROSS-REFERENCE TO RELATED APPLICATION

This application is a divisional of U.S. patent application Ser. No. 12/016,576, filed Jan. 18, 2008, titled SERVICES PORTAL, which is a continuation of U.S. patent application Ser. No. 10/680,411, filed Oct. 8, 2003, titled SERVICES PORTAL, now U.S. Pat. No. 7,328,078, which claims priority to U.S. Provisional Application Ser. No. 60/416,538, filed Oct. 8, 2002, titled PERFORMANCE STATION, all of which are hereby incorporated by reference in their entirety.

TECHNICAL FIELD

This disclosure relates to industrial processes, and more particularly to optimization of industrial systems.

BACKGROUND

A great challenge of managing industrial systems and process plants is the ability to improve and validate system performance. Companies want stable system platforms that all but eliminate downtime.

Many factors affect system stability and downtime. For example, these factors range from human aspects such as inadequate, incorrect or confusing procedures, and insufficient training to other factors such as poor system/application design and engineering and improper or less than optimum equipment. Various mechanisms have been developed to account for and/or monitor some of these factors. However, there exists a demand for new methods and technology to supplement traditional mechanisms used to provide system stability and improve performance.

SUMMARY

In one general aspect, a proactive monitoring and reporting appliance collects information from various field devices that are part of an industrial process to enable proactive, predictive remote monitoring services that implement a dynamic performance strategy. Unlike fault tolerant systems, that allow for system failures and continue to operate despite them, proactive, predictive remote monitoring seeks to avoid failures altogether. Therefore, a predictive analysis monitor is provided to identify potential and intermittent hardware, network, application faults and potential system unreliability issues before failures occur. Once identified, the predictive analysis monitor gives advance warning through alarm messaging either back to a remote performance-monitoring center and/or to a local interface.

The predictive analysis monitor obtains data from various event log files or on site process controllers or gathers process parameter data directly from the field devices. The predictive analysis monitor then applies data pattern/signatures, thresholds, tolerances and analysis techniques to detect and classify faults or instabilities and to diagnose potential failures. Each of these thresholds, tolerances and analysis techniques undergo expert review and analysis to assist in the diagnosis and to verify and validate any proposed solutions.

The predictive analysis monitor also gathers data to assist in optimizing the current process and to achieve improved economic value from the process, a greater return on investment for capital equipment and from the process.

The predictive analysis monitor can be used as part of a business relationship established between the supplier and a manufacturing/processing company whereby the services portal and the analysis provided from its data collection and analysis, including the expert analysis provided by the supplier's experts, are provided by the supplier as a service to the manufacturing company, who may lease the services portal.

In one general aspect, a method of improving a manufacturing client's business performance includes determining a current baseline business performance for the client including identifying targeted areas of improvement in the manufacturing area, analyzing potential economic gain that may be realized for each targeted area, identifying dynamic performance measures for each targeted area, monitoring industrial process parameters within the target areas and developing baseline dynamic performance measures of the target areas, analyzing the baseline dynamic performance measures to identify areas for optimization within the industrial process, and optimizing the industrial process parameters based on the analysis of the baseline measures. Determining a current baseline business performance for the client can include on site study of the plant process.

In one aspect, identifying targeted areas of improvement may include identification of deficient performance of the process using economic analyses. Identifying dynamic performance measures for each targeted area may include identifying measurable process parameters that are directly related to economic performance of the targeted area.

Monitoring industrial process parameters within the target areas and developing baseline dynamic performance measures of the target areas can include observing multiple performances of the processes associated within each target area, and evaluating economic effects of the individual industrial process parameters. Monitoring industrial process parameters can also include establishing a baseline optimum value for each process parameter based on multiple performances of each process.

Analyzing the baseline dynamic performance measures to identify areas for optimization within the industrial process may include evaluating the economic effects on the product of the industrial process parameters.

In another general aspect a method of optimizing industrial production includes providing an onsite production process parameter-monitoring device to a client for monitoring the parameters of a set of field devices associated with a client production process where the monitoring device can transmit process data offsite for analysis. This method can include associating the monitoring device with a data output of each field device within the set of field devices, where each field device gathers process parameter data associated with an operation performed and transmits the data to the monitoring device associated with the process. Each field device can be monitored through a plurality of performances of the process, while gathering parameter data from each performance and transmitting the gathered data offsite for analysis. Gathering parameter data for each performance of a field device can include splitting the data stream from each field device into individual process parameter data, creating a data historian for each parameter, for each field device and for each production process, storing the data in an on-site central data collection device and in an offsite storage and analysis device.

In one aspect the method can also include maintaining an on site central data collection device wherein all of the data associated with the process is collected for on site and offsite use. Associating the monitoring devices with a data output of every individual field device can include defining a potential data output stream from each field device and establishing a data communications link between each field device and the associated monitoring device. In this aspect, defining a potential data output stream can include identifying relevant process parameters, and ensuring that each relevant process parameter is being monitored. Establishing a data communications link between each field device and the associated monitoring device includes linking the field devices to the associated monitoring device using any combination of wireless, infrared, RF, direct connect, POTS, Ethernet, LAN, WAN, internet, intranet, fiber optic, optical, or any other type of communications link that can be made between two or more data storage or processing devices. Similarly, the monitoring devices transmit the data offsite using any combination of wireless, infrared, RF, direct connect, POTS, Ethernet, LAN, WAN, internet, intranet, fiber optic, optical, or any other type of communications link that can be made between two or more data storage or processing devices.

A method of optimizing industrial production includes providing a plurality of onsite production process parameter monitoring devices to a client for monitoring the parameters of a set of field devices associated with each client product wherein each monitoring device can transmit process data to an offsite analysis group, associating the monitoring devices with a data output of each field device in the set of field devices, wherein each field device gathers process parameter data associated with the operation performed and transmits the data to the monitoring device associated with the process, monitoring each field device through a plurality of performances of the process, while gathering parameter data from each performance, transmitting the gathered data offsite for analysis, and analyzing the gathered data offsite using process experts, wherein the process experts develop optimal physical parameter ranges for each field device of each client production process.

In one aspect, the method of optimizing industrial production can also include an on-site central data collection device wherein all of the data transmitted offsite is collected for on-site use. This method can also include transmitting the optimal physical parameters for each field device of each client production process to the client and making adjustments to a field device controller for each field device, wherein the adjustments are based on the analysis of the data performed by the experts. The data analysis can include developing a statistical model for the data, developing simulation models of the process using the data, and doing a trend analysis of the data. The adjustments can be made in the process while the process is running or while the process is idle and can result in optimal productivity for the process.

An apparatus for monitoring performance of an industrial process can include a service portal for collecting, transmitting and analyzing parameter data from process field devices. The service portal can include a network connection that connects to a process control system of the industrial process, a remote collector that collects parameter data from process field devices, a processor that identifies, sorts, and stores the collected parameter data, and a communications module for transmitting the stored parameter data to a remote monitoring station for analysis. The network connection can be a wireless network connection, an optical network connection, a radio frequency network connection, a LAN, a WAN, a POTS, a SONNET network, a DSL connection, an ISDN connection or any other type of network connection. The remote collector can collect the parameter data from a workstation. The processor may perform simple analysis of the parameter data including trends analysis, statistical analysis, data modelling and simulation development of the process.

The details of one or more implementations of the invention are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Overview

Figure 1:
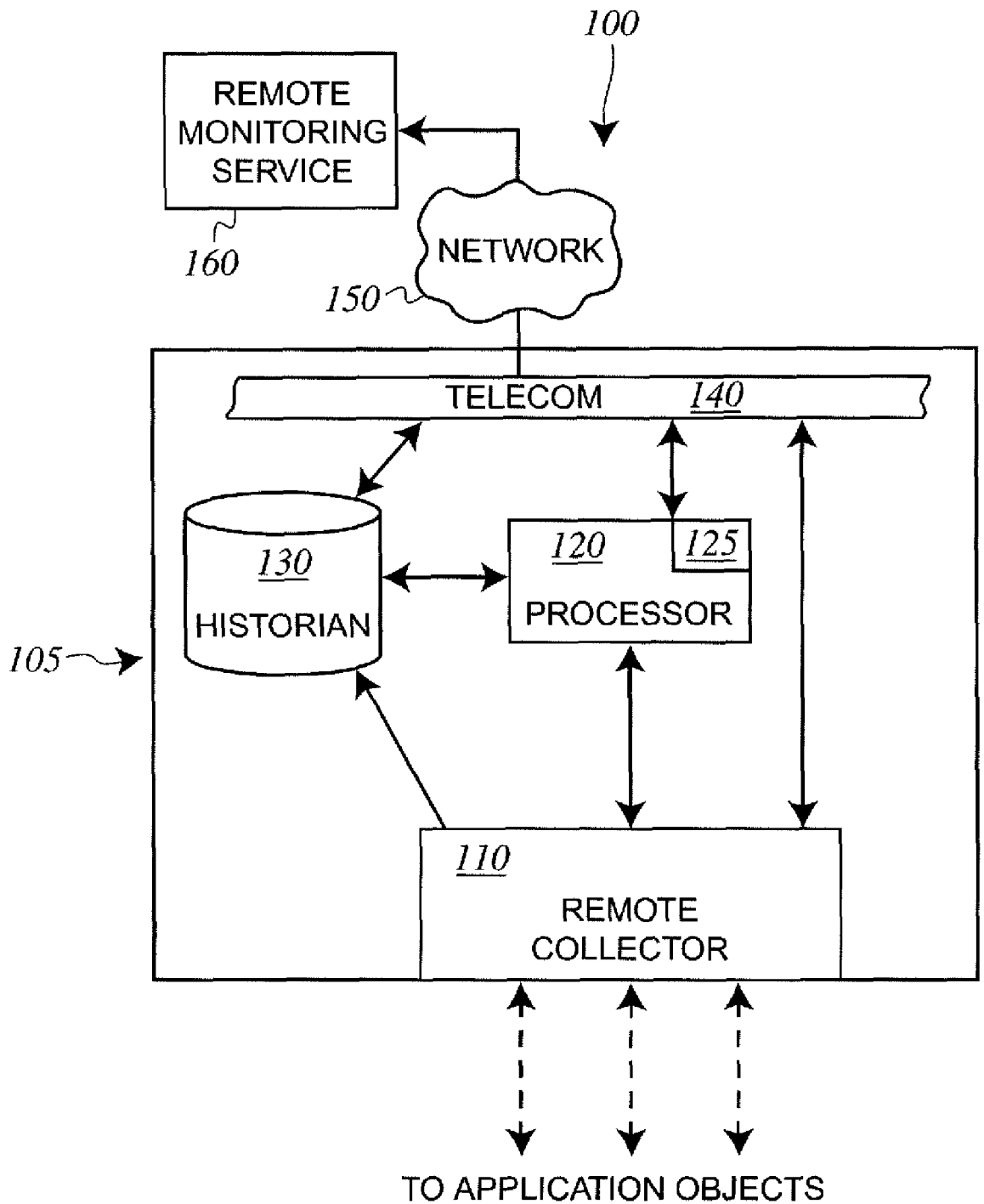
FIG. 1 is a block diagram of a performance station.

Many industrial processes are implemented by various resources or devices located throughout an industrial system. Continuous, batch and semi-batch industrial processes are implemented by various field devices that are automated and may be controlled by intelligent automated systems. Intelligent automated systems include various process control systems including programmable logic controllers (PLC), processors, workstations, communications systems software and related infrastructure that monitor and control the field/plant devices to implement the industrial processes.

Intelligent automated systems provide information to business systems that manage the industrial processes. For example, the business systems may be used to supervise and control the intelligent automated systems and ensure that the processes are operating as desired. The business systems also may be used to implement business decisions, adjust production and process parameters, and generally control the industrial processes.

To improve overall system performance, proactive, predictive monitoring services and reporting stations collect information from the intelligent automated systems to implement a dynamic performance strategy. Unlike fault tolerant systems that allow for system failures, proactive, predictive remote monitoring services help to avoid failures altogether and improve system availability and performance.

Proactive, predictive monitoring services improve system performance by identifying potential and intermittent field device, hardware, network, and application faults, and potential system unreliability or instability issues throughout the monitored industrial process. Once identified, various indications and advance warnings are provided by analysis reports, alarm messaging, and graphical user interfaces. The indication and advanced warnings may be provided to or identified by a remote performance-monitoring center and/or on site to a local operator so that appropriate action may be taken to maintain or optimize system availability and performance.

A services portal provides a platform for the proactive, predictive monitoring services. A predictive analysis monitor obtains data from various event log files from workstations or on site process controllers. The predictive analysis monitor stores and reports the collected data, and provides data threshold alarming, rate-of-change alarming, and trend alarming, based on the collected data.

The predictive analysis monitor also provides analysis tools, such as, predictive failure analysis, loop performance analysis, asset management, process modeling, and performance modeling. The predictive analysis monitor applies the analysis tools to the log files and collected data to help detect and classify faults, to diagnose potential failures, and to improve/maintain system performance. As a result, system performance is increased by proactively monitoring critical industrial control processes to maximize system availability, uptime, and use of system resources. The predictive analysis monitor also reduces maintenance time and cost through predictive maintenance using the analysis tools to provide notification of the deterioration of system component health and through comprehensive graphical user interfaces, and reporting.

System Overview

FIG. 1 shows one implementation of a services portal 105 with performance analysis monitor 100 that can be connected to a variety of automated industrial process systems. The services portal 105 is the hardware portion of the system while the performance analysis monitor 100 performs the software and data analysis functions. The services portal includes a remote collector 110, which connects to the various levels of the industrial process. The remote collector 110 can connect and/or communicate directly with application objects (described in greater detail below) at the individual field devices or workstations, collecting data representing the process parameters at the point of measurement, or can connect and/or communicate with an industrial process' integrated controller or host workstation and can collect data at that level. In addition, the remote collector 110 can connect to, communicate with, and collect and interpret data from application objects at all other levels of controllers and process parameter indicators, analog or digital, including independent workstations, programmable logic circuits, proportional, proportional-integral, proportional-integral-derivative controllers, host workstations, automated process controllers, distributed control systems, centralized control systems, individual sensors, handheld data collection devices, servers, mini computers, and any other devices used to indicate process data values or control processes.

The information can come in various forms such as real-time individual values to stored historic data and can be recognized, sorted and stored in the performance analysis monitor's historian database. The individual connections can be wireless, infrared, optical, RF, Ethernet, LAN, WAN, POTS, SONNET, and other common data communications types or combinations of data communication types. As the data from the industrial process is gathered by the remote collector 110, the performance analysis monitor 100 can send the data to a processor 120 that includes a loop analyst process 125 to perform an initial real time data analysis of the process including a loop analysis. While monitoring the process, the performance analysis monitor 100 can build an historian database 130 that records the historical parameters of the industrial process. This historian 130 can be accessed either locally or remotely to conduct optimization analysis on the industrial process from the top level all the way down to the individual field device level. The services portal 105 includes a telecommunications module 140 that may communicate through a network 150 in order to remotely report alarm status, provide for remote access, and to provide maintenance access and reporting to a remote monitoring service 160. The network 150 may be a LAN, WAN or other communications network including the Internet. All communications external to the process network can be security protected using a variety of protection schemes including firewalls and data encryption.

Performance Analysis System

Figure 2:
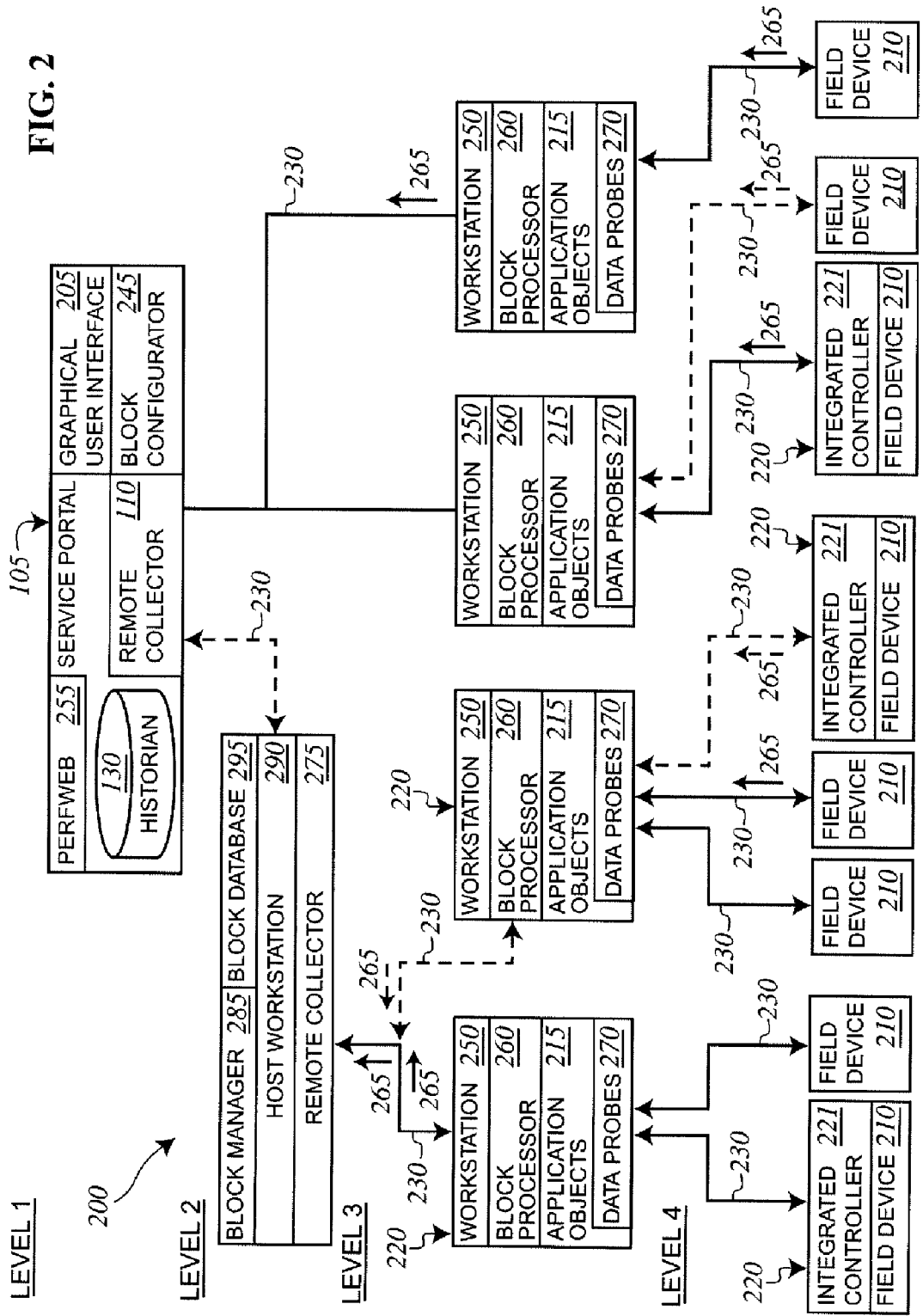
FIG. 2 is a diagram of a services portal connected to an exemplary industrial processing system.

FIG. 2 shows the performance analysis monitor 100 connected to a client's industrial process. The performance analysis monitor 100 may include connections to various field devices 210 that implement one or more industrial field processes. Other connections may be to one or more process control devices 220 that implement intelligent automated applications to control the field devices 210 and the system processes.

The process control devices 220 can communicate on various network data paths 230. The process control devices 220 can be individual workstations 250, integrated process controllers 221 that are part of the field device 210, hand held process controllers that supply individual instructions to and retrieve real time and archived data from field devices throughout the process (not shown), and host workstations 290 that gather data from a variety of process field devices and workstations 250. The communications network data path 230 may be implemented using various communication media and networks. The communications network path 230 may be configured to send and receive signals (e.g., electrical, electromagnetic, RF, or optical) that convey or carry data streams representing various types of analog and/or digital content. For example, the communications network path 230 may be implemented using various communications media and one or more networks comprising one or more network devices. Examples of these may be servers, routers, switches, hubs, repeaters, and storage devices. The one or more networks may include a WAN, a LAN, an Ethernet, a plain old telephone service (POTS) network, a digital subscriber line (DSL) network, an integrated services digital network (ISDN), a synchronous optical network (SONNET), a wireless network or a combination of two or more of these networks. In addition, the communications network path 230 may include one or more wireless links that transmit and receive electromagnetic signals, such as, for example, radio, infrared, electromagnetic and microwave signals, to convey information. In one implementation, the process control devices 220 are connected using Ethernet connections.

The services portal 105 is connected to the control devices through a system network 240. The network may include any number of components and/or network devices such as hubs, routers, switches, servers, repeaters, storage devices, communications interfaces, processors, and various communications media to establish a local area network (LAN), a wide area network (WAN), a switched network, a radio network, a cable network, or a satellite network, or a combination of two more of these networks. In one implementation, the services portal 105 may be connected to various controllers by a TCP/IP Ethernet LAN.

As shown in FIG. 2, a performance analysis system 200 may include one or more workstations 250 that monitor and control various field devices 210. Each of the workstations 250 may include a general or special-purpose computer capable of responding to, generating, and executing instructions in a defined manner. The workstations 250 may include any number of other devices, components, and/or peripherals, such as memory/storage devices, input devices, output devices, user interfaces, and/or communications interfaces.

The workstations 250 also may include one or more software applications loaded on workstations 250 to command and direct each workstation 250. Applications may include a computer program, a piece of code, an instruction, or some combination thereof, for independently or collectively instructing the workstation 250 to interact and operate as desired.

The applications may be embodied permanently or temporarily in any type of machine, component, physical or virtual equipment, storage medium, or propagated signal wave capable of providing instructions to the workstation 250. In particular, the applications may be stored on a storage medium or device (e.g., a read only memory (ROM), a random access memory (RAM), a volatile/non-volatile memory, or a magnetic disk readable by the workstation, such that if the storage medium or device is read by the workstation, the specified steps or instructions are performed.

Each workstation 250 may include one or more block processors 260 that receive process data associated with system resources (e.g., free memory, disk space, control processor loading, configurable operating system resources, and kernel resources). The block processors 260 identify user-defined and enabled block types from the block database 295 and sets up application objects 215 to collect and store data gathered by data probes 270 associated with a specific field device 210.

Each workstation 250 may also include one or more data probes 270 that are associated with various processes and system resources. The data probes 270 supply resource and process data used by the predictive performance monitoring services. The data probes 270 may be implemented using software that monitor, collect, and populate application objects 215 with field device parameter data. The data probes 270 extract real-time and archived data (where available) from the individual field devices 210. The application objects 215 gather the extracted field device data, resource data and process information supplied by the data probes 270. In one implementation, there is a one-to-one relationship between an application object 215 and a data probe 270.

Figure 3:
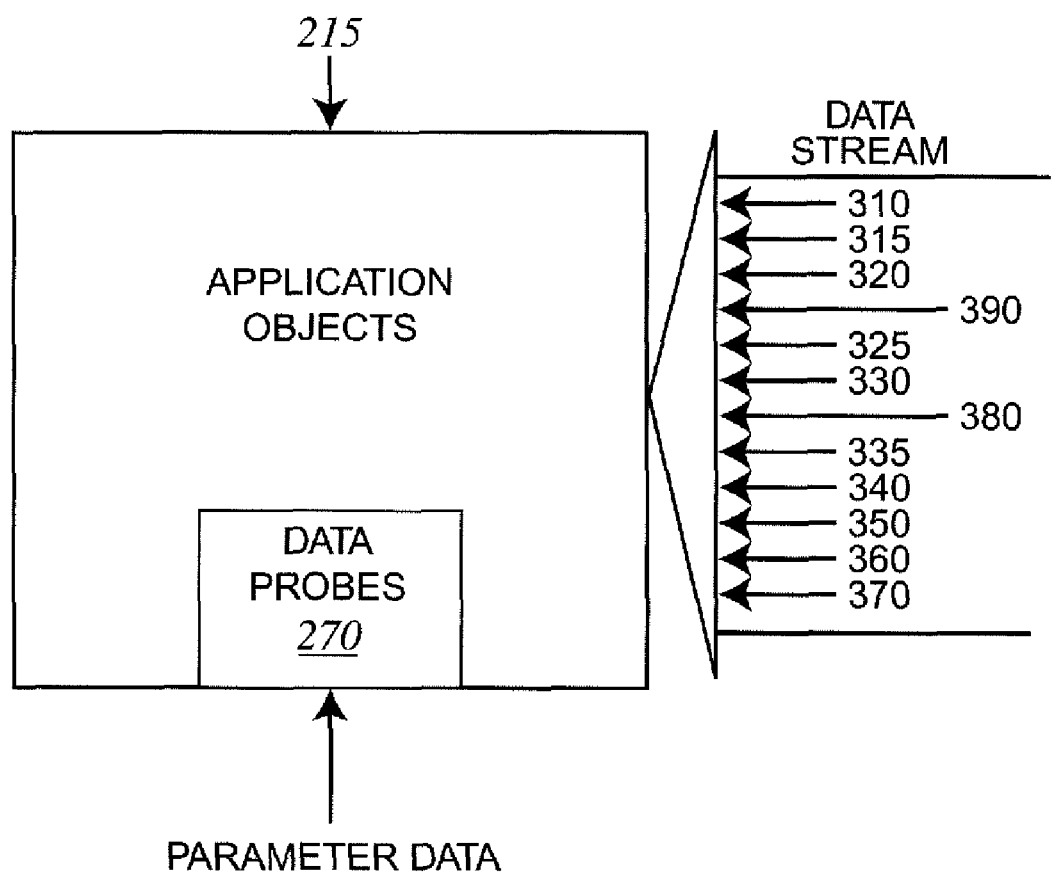
FIG. 3 is a diagram of an application probe object showing some of the possible inputs.

FIG. 3 shows an application object 215. Each application object 215 includes a set of common attributes used for system monitoring and alarms. For example, application objects 215 may include one or more of: a rate at which data is collected 310, a date of last update 320, a time of last update 330, an error string for a data probe error message 340, an indication that the data probe was executed during the specified period 350, a one shot execution of data probe to set attribute values 360, a signal to reinitialize a data probe 370, a description text string to describe the application object 380, an alarm description to be used in an alarm message 390, an object type 315, a log file to specify the path of a log file used by a data probe 325, and an application object version 335. Application objects 215 serve as data files that temporarily store the data gathered by the data probes 270 from the field devices 210. The remote collector 275 accesses and removes the data in the application objects 215 and sends it to the historian 130 for long term storage.

Returning to FIG. 2, each workstation 250 may also be provided with network and station resource monitoring software. The monitoring software can include at least two application object interfaces: one to monitor system and workstation resources, and a second to monitor workstation and network resource errors. The application object interfaces can be run by a block processor 260 that can gather the resource data using control blocks (for which the block processor has been programmed) as described in further detail below.

One or more host workstations 290 can be connected to server workstations 250 by communication network paths 230. The host workstations 290 can oversee the monitoring and data collection from their associated workstations 250. The host workstation 290 may configure the block processors 260 and collect the resource data (in control blocks) under supervision of the services portal 105 as described below. In addition to the data probes 270, application objects 215, and block processors 260, the host workstation 290 can include a remote collector 275, a block manager 285, and a block database 295.

The remote collector 275 collects application object data from one or more workstations 250 in the form of control blocks 265. The remote collector 275 receives process data from the communications network path 230.

The block manager 285 configures each of the block processors 260, and application objects 215. The block manager 285 communicates with each block processor 260 using the communications network path 230. The block manager 285 specifies the desired control block types to be associated with the application objects 215. The block database 295 stores all of the block types that may be used to configure the block processors 260. The block database 295 is used for configuration and deployment management only. In one implementation, the block database 295 may be implemented using an Informix database available from Foxboro. The block manager 285 accesses the block database 295 to provide the appropriate block types to the block processors 260 of the workstations 250.

The services portal 105 can be connected to each host workstation 290 by communications network paths 230. The services portal 105 provides for data collection and operates as a platform for the performance analysis monitor 100. The performance analysis monitor 100 includes a historian 130, a performance web (PERFWEB) 255, and a block configurator 245. The historian 130 supports the collection, storage, and retrieval of process data and alarms. The historian 130 works in concert with a powerful set of client-server and web-enabled desktop tools that provide access to key process management information (e.g., by the remote performance center 160 and through local onsite graphic user interfaces). The historian 130 collects real-time process data from any process, system, device, and/or system resource.

The historian 130 recognizes and collects all types of process data from application objects 215 and alarm objects that are obtained from the remote collector 275. The historian 130 also collects alarm and event messages including process alarms, operator actions, and system status messages and stores them in the historian database 130.

Installation and Deployment

Beginning with system initialization, the block configurator 245 provides a graphical user interface 205 to control the block manager 285 and block database 295 of the host workstations. The block configurator 245 configures the block processors 260 for the performance analysis monitor 100 in conjunction with the block managers 285 and block database 295. The configurator 245 communicates with the block database 295 using communications network paths 230. The graphical user interface 205 may run on any platform, for example the graphical user interface may run on a PC-NT platform or other environment (e.g., Windows 2000 or XP).

The block configurator graphical user interface 205 includes an install feature and a checkpoint feature. The install feature saves block types to the block database 295 and generates application object files from the block types. The block manager 285 accesses the application object files and transfers the application object files to each specific block processor 260. Each block processor 260 then creates the application object 215 from the application object files.

The block processor 260 of each workstation 250 creates the application objects 215 directly from application objects files provided from the block managers 285. The block processor 260 also initializes the application objects 215, defines the data probes 270 associated with the application objects 215, and performs periodic check pointing. Check pointing may be used to obviate a global data probe execution after a workstation reboot (which could overload the system).

The checkpoint feature updates the application objects' file corresponding to the application object interface. An upload feature corrects the block database 295 with the latest checkpoint update. A save feature updates the block database 295, generates a map file, transfers the map file to the target block processor 260, recreates the application objects 215 on the target block processor 260 and, where applicable, reestablishes the updates from the block processor 260 and adjusts the checkpoint feature and upload features.

When a workstation 250 is rebooted, the context associated with local application object 215 is established by accessing a predetermined local application objects directory. For each application interface, the block processor 260 opens the application interface's application objects file and uses the information to create the application objects 215 and open the application interface's initialization file and use the information to initialize attributes to their check pointed values.

A detail display (with overlays) is provided for each block type. Detail displays for alarm blocks also are provided that include the viewing of the alarm state and the acknowledging of the alarm.

The structure will be:

CMP.r file containing a list of the Compound Names.

<COMPOUND>.r file containing a list of the Block Names in a specific Compound.

<BTYPE>.fdf Display File template for each specific block type.

<BTYPE_OVERLAY>.fdf Overlay Display File template for each specific block type.

The .r files and the .fdf files are disseminated to each workstation 250. When a compound or a block (instance) is added, the .r files are updated in each workstation 250.

The performance analysis monitor 100 presents measurement and alarm information concerning workstation performance using the application object variables. Monitoring blocks are used to gather and update the application object variables from associated data probes. Alarms are used to warn the manufacturer of out of specification conditions at specific field devices that may indicate imminent device failure, unsafe conditions, or unacceptable product.

Alarming may be configured using dedicated alarm blocks. For example, the following alarm block types may be provided: low, low low and rate-of-change on one measurement; high, high high and rate-of-change on one measurement; and state alarm on one measurement.

The alarm block may incorporate one or more alarm objects. The Alarm Objects may include alarm attributes. Examples of High Absolute Alarms are:

| | |
|---|---|
| <Application>:<Object>.HA00OP | Alarm Option |
| <Application>:<Object>.HA00GR | Alarm group |
| <Application>:<Object>.HA00PR | Alarm Priority |
| <Application>:<Object>.HA00LM | Alarm Limit |
| <Application>:<Object>.HA00DB | Alarm Deadband |
| <Application>:<Object>.HA00TX | Alarm Text |
| <Application>:<Object>.UNACK | |
| <Application>:<Object>.ALMSTA | |
| [<Application>:<Object>.PRTYPE] | |
| [<Application>:<Object>.CRIT] | |

The block processor 260 creates the applications and application objects directly from map files, creates the applications and application objects with alarm attributes; initialize applications; get values to source application objects (e.g., instead of connection mapping) and perform periodic check pointing.

Performance Enhancement Business Model

The performance analysis monitor 100 provides a services supplier the opportunity to create and implement a new business model with the service portal 105 serving as the supplied hardware. This business model recognizes the availability of cost savings to potential clients by using the performance analysis monitor 100 to optimize client utilization of capital assets to maximize return on investment (ROI) and process output. One example of this new business model has been developed as a Performance Alliance Agreement.

Figure 4:
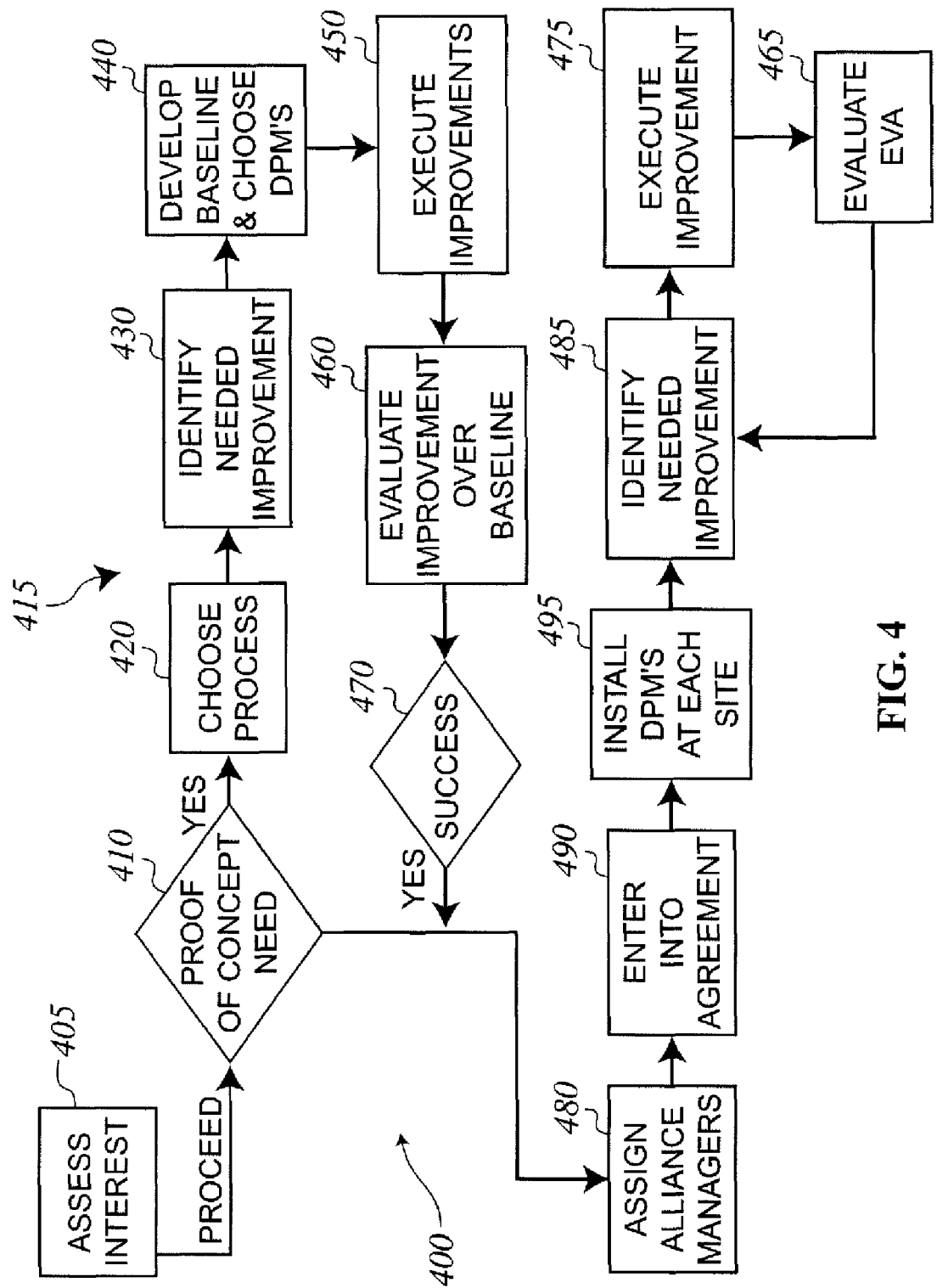
FIG. 4 is a flowchart of an example of the performance alliance agreement business model.

FIG. 4 is a flowchart of the Performance Alliance Agreement business model 400. Interest in an agreement is assessed 405 and the decision to proceed is made. The manufacturer may choose to have a proof of concept demonstration 410 performed prior to entering into a full agreement. If the proof of concept path 415 is not chosen, the process continues with the manufacturer and supplier assigning alliance managers 480. If the proof of concept path 415 is chosen, the proof of concept testing is generally performed on one or a few of the manufacturer's processes chosen jointly by the manufacturer and the supplier 420. The first step is identifying needed improvements in the process 430, followed by developing the baseline and choice of dynamic performance measures (DPMs) 440. The improvements are executed 450 using the system with continuous tuning of the system and the improvement is evaluated 460 by comparison to the baseline 440. Assuming a successful demonstration 470, the manufacturer and supplier assign alliance managers 480, who enter into a performance alliance agreement 490, whereby the established DPMs from step 440 are used to develop the baseline for each of the manufacturer's processes, needed improvements are identified 465, executed 475, and evaluated for the economic value added (EVA) 485. The process is continuously evaluated and improved until it is no longer economically a sound investment to implement additional improvements.

In a Performance Alliance Agreement between a manufacturer and a supplier these fundamentals are used to develop a mutually beneficial relationship that pools the experience and intellectual capital of both parties to achieve improved financial results by leveraging the deployed assets of the manufacturer. This is realized through:

1. The joint selection of areas in the manufacturing operations targeted for improvement;
2. An analysis of the potential economic gain that may be realized for each selected operation;
3. Agreement on the commercial terms for implementing each improvement activity;
4. Identifying and implementing dynamic performance measures (DPM's);
5. The calculation of the baseline of economic performance for each operation by running the dynamic performance measures (invisible) for an agreed upon baseline period;
6. The execution of each of the improvement activities;
7. Determination of the economic value added through ongoing DPM analysis; and/or
8. DPM's are monitored on an ongoing basis to ensure that continuous improvements are occurring.

Performance services are intended to ensure that the economic value generated by such an alliance is greater than the cost of the services.

In order to enhance system performance, a review of business strategy and market conditions is performed to identify opportunities for performance improvement that are consistent with the business strategy, the financial, the human resources, and the fundamentals of the business relationship, (including mutual expectations of risk management and commensurate rewards for both parties).

The conclusion, if agreement is reached, is a commitment to proceed with an action plan that includes allocation of financial and human resources to execute the plan. If agreement is not concluded the parties have the choice of continuing the Assess Interest discussion or adopting a different approach to performance improvement.

Entering into a performance alliance sometimes poses a challenge to the traditional business model and adjustments may be required to the cultural business environment to accommodate a long-term benefit and risk-sharing partnership. Significant to this adjustment is the acceptance of DPM as metrics of performance baseline and improvements realized that require reconciliation with the existing standard internal management information system-derived performance reports. Developing the cooperative model necessary to gain experience with solving these and other operational issues can be accomplished in a proof of concept performance contract (path 415) between the supplier and the manufacturer for one or two sites or areas in order to build mutual trust and confidence to accept this new approach to a business relationship that extends beyond the typical legal definitions of an agreement.

One goal is to determine how the business can be improved, by using integrated solutions that reduce opportunity cost, while supporting the need for operational agility, with continuously current solutions. To acquire the necessary funding, the migration plan may define how potential changes will yield an acceptable ROI within a reasonable payback period. The ability to support the vision, meet project ROI and payback requirements, and improve the on-going Return on Assets (ROA) is the a core function of an effective migration plan, and the value of completing a Benefit Study and Business Case Analysis (described below).

The Benefit Study and Business Case Analysis should answer the following questions:

1. What is the business vision, and the operational strategy and goals?

2. What is the "As-Is" enterprise model? Enterprise models are pictorial representations of the organization, its goals, workflow, production process, and data flow. They can be easily produced and verified by the process owners. Thereafter, they help focus and improve the following types of analysis.

3. What are the Key Process Inputs (KPIs) and Key Process Outputs (KPOs) for each step in the existing work process or production models? KPIs and KPOs may include: goals, schedules, information, labor, materials, equipment, and energy. How is quality managed with regard to each KPI or KPO? What are the activity based cost drivers? What is the capacity and throughput? How are decisions regarding the use of resources made? Are they consistent? What's the net contribution to ROA? What is the variance? What factors govern success and add value at each step?

4. What types of failures occur? How often do they occur? Do they go unnoticed? How severe are they? What are the risk priorities?

5. What is the "opportunity cost" within the enterprise's workflow (i.e., the cost of failures, poor decisions regarding resource usage, and gaps in current capabilities)?

6. What capabilities and characteristics are needed to satisfy the vision, and to limit/eliminate existing opportunity cost? Which are essential?

7. What functional gaps exist between the As-Is enterprise model, and the defined vision and goals (i.e., the wish list)?

8. What types of success measures can be employed to manage the effectiveness of the process and to support a continuous improvement program?

9. What would a "To-Be" model look like? One that is based on standards, and limits the need for customization. How will it improve the success measures?

10. What are the best "fit for purpose" solution elements? What is the installed cost and schedule for implementing the To-Be model, and to achieve "operational readiness"?

11. How should the transition be prioritized with regard to needs, "fit" and "viability" factors? How can the Implementation Plan maximize the net positive cash flow from each improvement? Are there "low hanging fruit"? That is, improvements that can be implemented quickly to help fund the more costly investments?

12. What is the ROI and payback period? How sensitive is the pro-forma ROI with regard to potential risks?

13. Can capital leasing improve the net present value of cash flow and the program's ROI?

14. How can the transition be managed to limit risks?

15. What are the benefits of completing the transition using a win/win performance-based contract?

General Methodology

The payback requirement discovery and design efforts need to be thoroughly coordinated, and provide open communications between key business and operations management personnel of the manufacturer, and the Supplier. The Benefit Study (described above) provides:

1. Reviewing business opportunities, vision and goals, and facilities operating requirements;

2. Completing detailed "as-is" vs. "to be" enterprise models defining the production and work process for the business functions;

3. Defining the Business and Production Models. Identifying optimization opportunities;

4. Specifying the sensor to boardroom integration requirements;

5. Defining a balanced set of dynamic performance measures (DPM's) based on key performance factors;

6. Mapping requirements to applications and identifying the best-fit, least cost solutions;

7. Finalizing the "To-Be" model for implementation and developing a project implementation & management plan, including:

A. Solution scope definition & budgets;
B. Installation requirements;
C. A pro-forma ROI;
D. Guaranteed performance contracting measurements;
E. Implementation and management plan; and
F. Lifetime support & alliance partnership plan.

Following the on-site study a performance improvement team submits a proposal that defines the improvement benefits and from which these improvements will be derived. Included in this proposal are optional funding project(s) approaches. A selection of approaches is available including either a capital budget as a traditional project, or operating budget using the positive cash flow generated from the improvement.

In a traditional project capital funds are approved by management and assigned to the performance improvement project through the normal approval process.

Today more companies are choosing to partner with a third party in order to conserve capital and improve the return on capital employed ratio.

By using a shared investment model, the amount of capital required is limited. The manufacturer providing the funding for only the direct out-of-pocket costs facilitates this. A percentage of these costs is payable at the start of the performance improvement project and the balance as the costs are incurred. Once the system is started the improved performance metrics will be immediately available and a trend can be plotted and compared against the target expectations. This trend is monitored and analyzed by experts from the supplier.

This reduces the risk and provides incentive to the alliance to develop a close working relationship to limit the negative cash flow excursion and reach the cross over to operating budget funding. At this point the supplier starts the clock to receiving pre-agreed performance measurement intervals. At the conclusion of this term of contract payments the ownership of the system is transferred to the manufacturer and 100% of the improvement benefits accrue to the manufacturer.

With a shared benefit model, the operating budget is used to provide the funding with the cost payments being offset until the performance improvement positive cash flow starts once the system is commissioned. A fixed percentage of the performance improvement benefits and the term is agreed and stipulated in the contract. Ownership of the performance analysis monitor improvements remains with the supplier. At the end of the term, (that depends on the percentage and value) ownership may be transferred to the manufacturer for a token sum to be stipulated.

A project evaluator financial modeling tool is used to predict the key performance benefits, payment schedule, cash flows and ROI term using the information gained from the performance improvement study. The ROI term to cross into generating positive cash flow is shown as well as the estimated maximum negative cash flow obligation as a capital appropriation.

To establish the benefit improvement the present baseline performance must first be established. A processing plant control apparatus provides real-time indications of performance of plant operations with respect to current state of process means.

Identification of these economic performance metrics is made by a certified performance analyst (usually working for the supplier) using a standard methodology to derive the measures. Plant-level performance measures provide a starting point for the analysis of a total plant DPM structure. Plant-level performance measures must next be decomposed to determine the correct measures of performance at the area, and/or unit level.

This decomposition is accomplished via subsequent "Vollmann Triangle" analyses down to the lowest operational level in the plant. A complete plant analysis of this type is referred to as Vollmann decomposition. It is important that the decomposition analysis continue down to the lowest point in the structure for which an operations person has authority and responsibility. Ultimately, this top-down analysis will identify and specify the appropriate measures of performance for each individual at all levels in the manufacturing operation.

Once this decomposition has been accomplished, and the appropriate measures of performance have been identified for the plant and each area and unit then the process measurement requirements necessary to directly make, calculate, or infer the lowest level of performance measures must be identified. In some cases, additional process sensors may be needed to effectively model or calculate the appropriate performance measures.

The performance analyst should investigate other potential alternative input for a DPM model prior to requesting the addition of a new physical sensor.

Effective implementation starts at the lowest level in the performance measurement hierarchy. DPM's are implemented by bringing the process measurement values into the control system and using the capability of the I/A Series control package to directly measure, calculate, or infer each of the DPM's for each operational area.

The value of each DPM should be set up to be recomputed on a time or event basis relative to the natural time constant of the particular plant section. The target value of each DPM should reflect the current economic and/or market conditions that drive the plant's manufacturing strategy.

Once the DPM's in one of the lowest level areas are implemented, work should proceed to incorporate the other operational areas in the plant at this same level. After first level DPM's are operational, the next higher level should be developed and so on right up to the highest level for the operation. Each node in the DPM hierarchy should correspond to a management point in the organizational hierarchy. In this way DPM's are consistent with the DPM's directly below and above them in the hierarchy and manager measures will always be directly dependent on the performance of his or her subordinates.

The DPM analyst submits a complete written report for plant manager approval. This is to insure that the performance metrics are aligned with the plant and corporate business strategy. Once this signature is received an engineer ensures that the DPM's are implemented and the baseline performance measurements are collected and analyzed for a predetermined a period before the improvement project is completed.

A team is formed with representatives from the supplier and the manufacturer to implement the improvement strategy. In many cases where software is used to improve the process (modeling & optimization, loop tuning etc.) the services portal 105 with the software and application engineering installed, is located at the manufacturing location. This services portal 105 has the ability to connect to the legacy system fieldbus and via a communications network path to a remote monitoring station (e.g. remote monitoring station 160) of the supplier. This enables the implementation to be developed and tested off-line prior to installation without interfering with the legacy system operations. Remote monitoring begins immediately after the improvement is ready to start. This enables supplier performance analysts to continuously monitor the performance improvement without site intervention. If a performance alarm occurs the team can immediately analyze the problem and take corrective measures.

In the proof of concept stage 410-470 the objective is the development of mutual confidence between the two companies working together for the first time in a performance improvement alliance. A successful outcome is the goal of both parties and mitigating risk is a high priority. The joint operating know-how, engineering knowledge and industry experience is a powerful combination enhanced by powerful tools and technology to mitigate as much as possible the risk factors of cultural and operating changes.

The team begins the analysis of the performance real time improvement metrics derived from the DPM's to make sure that the trend is on a path to meet the expected performance improvement targets established in the contract. Periodic site visits and continuous remote monitoring are used to improve the performance and the team communication. Reactions to business strategy due to market conditions, lost opportunities and the performance of the virtual profit centers created by the DPM methodology are closely scrutinized and adjustment made as required to the improvement strategy and if necessary to the baseline metrics.

The proof of concept project performance contract will stipulate by mutual agreement, certain measurement points to conclude that the test results met or did not meet mutual expectations. Typical performance measures include:
　　Increased throughput
　　Reduced energy consumption
　　Reduced waste
　　Reduced inventory cost With the successful conclusion of the proof of concept phase the parties meet at the executive level to conclude the Performance Alliance Agreement that sets out the relationship of the partners and the measurement criteria for a long term mutually rewarding relationship. Both partners are strongly encouraged to assign Executive Alliance Managers to oversee all aspects of the alliance and to be aligned with the business strategy of the manufacturer to manage, drive and report progress of the alliance.

Both partners also agree to assign Executive Sponsors to the Alliance to provide the appropriate level of executive support to the alliance activities.

Each partner agrees to assign other resources to the Alliance team as requested by the Executive Alliance Manager.

The same methodology is used at remaining sites. As more sites are added the Alliance Managers will develop a uniform corporate commercial agreement for all sites using an internal RFP process. This will accelerate the speed of improvement deployment and reduce cost.

The Performance Alliance Agreement (PAA) defines the relationship, responsibilities, measures and mutual expectations of a long-term relationship. A PAA is the embodiment of this relationship that is based on trust, team sprit with a common goal to improve the competitive position of the manufacturer through a combination of operating and technical experience and modern tools and engineering knowledge.

Economic Value Added (EVA) is the ultimate measure of the Performance Alliance Agreement. EVA is defined as: After tax operating income−cost of capital×(total assets−current liabilities). EVA measures the excess of a company's operating income over the cost of the capital involved.

Once an Automation Process Modeling exercises has been completed it is often tempting to believe the task is done and to essentially go back to business as usual. In the dynamic competitive environment created by the globalization of the past ten years this would be a huge mistake. A continuous performance improvement process should be built right into the automation planning activities. Every action that results in improvement of the performance measures should be followed by a search for the next action that may help. In this way the economic performance of the operations will continually improve and the automation system technology will become the decision support system to help drive the improvement. Also, whenever a major change takes place in the company's markets, a new strategic analysis might need to be executed. This may result in a revised competitive strategy and new performance measures. Without this type of continuous strategic analysis the operations within the company may be working to the wrong performance measure.

To offset the problem the supplier may offer a suite of Lifetime Performance Services. These services are designed to continuously monitor the DPM's to insure that the operating performance gains are not negatively affected by factors such as loop tuning, asset modifications, operating strategy, current technology upgrades operator variations etc.

A number of implementations have been described. Nevertheless, it will be understood that various modifications may be made. For example, advantageous results may be achieved when the steps of the disclosed techniques are performed in a different order and/or when components in a disclosed system, architecture, device, or circuit are combined in a different manner and/or replaced or supplemented by other components. Accordingly, other implementations are within the scope of the following claims.

What is claimed is:

1. A method of improving a manufacturing client's business performance comprising:
   determining a current baseline business performance for the client including identifying targeted areas of improvement in the manufacturing area, each targeted area being associated with one or more industrial processes;
   analyzing a potential economic gain for each targeted area;
   identifying dynamic performance measures for each targeted area;
   monitoring industrial process parameters within the target areas, each industrial process parameter being associated with an industrial process;
   developing baseline dynamic performance measures of the target areas based on the monitoring of the industrial process parameters;
   analyzing the baseline dynamic performance measures to identify areas within the targeted areas of improvement for optimization;
   optimizing industrial process parameters associated with the identified areas within the targeted areas of improvement based on the analysis of the baseline dynamic performance measures; and
   measuring, after the optimization, the industrial process parameters associated with the identified areas and developing second baseline dynamic performance measures based on the measured industrial process parameters.

2. The method of claim 1 wherein determining a current baseline business performance for the client includes on site study of the manufacturing area.

3. The method of claim 1 wherein identifying targeted areas of improvement includes identification of deficient performance of the process using economic analyses.

4. The method of claim 3 wherein using economic analyses includes defining how potential changes will yield an increased return on investment over the determined current baseline business performance.

5. The method of claim 1 wherein identifying dynamic performance measures for each targeted area includes identifying measurable process parameters that are directly related to economic performance of the targeted area.

6. The method of claim 1 wherein monitoring industrial process parameters within the target areas and developing baseline dynamic performance measures of the target areas includes:
   observing multiple performances of the one or more processes associated within each target area; and
   evaluating economic effects of the industrial process parameters.

7. The method of claim 1 wherein monitoring industrial process parameters includes establishing a baseline optimum value for each process parameter based on multiple performances of each process.

8. The method of claim 1 wherein analyzing the baseline dynamic performance measures to identify areas within the targeted areas of improvement for optimization includes evaluating the economic effects on a product of the industrial process parameters.

9. The method of claim 1 wherein determining a current baseline business performance for the client includes an on site study of a plant-level process.

10. The method of claim 1 wherein determining a current baseline business performance for the client includes analysis of plant-level performance measures.

11. The method of claim 10 further comprising decomposing the plant-level performance measures to a measure of performance at a manufacturing process level or a unit level.

12. The method of claim 11 wherein the measure of performance is specific to the manufacturing process level or the unit level.

13. The method of claim 1 further comprising comparing the second baseline dynamic performance measures to the baseline dynamic performance measures to determine whether the optimization resulted in an improvement.

* * * * *